(12) United States Patent  
Skvortsov et al.

(10) Patent No.: US 9,160,680 B1
(45) Date of Patent: Oct. 13, 2015

(54) SYSTEM AND METHOD FOR DYNAMIC NETWORK RESOURCE CATEGORIZATION RE-ASSIGNMENT

(71) Applicant: Kaspersky Lab ZAO, Moscow (RU)

(72) Inventors: Vladimir A. Skvortsov, Moscow (RU); Evgeny B. Kolotinsky, Moscow (RU)

(73) Assignee: KASPERSKY LAB ZAO, Moscow (RU)

( * ) Notice: Subject to any disclaimer, the term of this patent is extended or adjusted under 35 U.S.C. 154(b) by 0 days.

(21) Appl. No.: 14/546,822

(22) Filed: Nov. 18, 2014

(51) Int. Cl.
  *G06F 15/173* (2006.01)
  *H04L 12/911* (2013.01)
  *G06N 7/00* (2006.01)
  *H04L 12/26* (2006.01)

(52) U.S. Cl.
  CPC .............. *H04L 47/781* (2013.01); *G06N 7/005* (2013.01); *H04L 43/12* (2013.01); *H04L 43/14* (2013.01)

(58) Field of Classification Search
  None
  See application file for complete search history.

(56) References Cited

U.S. PATENT DOCUMENTS

| | | | |
|---|---|---|---|
| 5,704,017 A | 12/1997 | Heckerman et al. | |
| 5,933,827 A | 8/1999 | Cole et al. | |
| 5,999,975 A | 12/1999 | Kittaka et al. | |
| 6,161,130 A | 12/2000 | Horvitz et al. | |
| 6,460,036 B1 | 10/2002 | Herz | |
| 6,981,040 B1 | 12/2005 | Konig et al. | |
| 7,089,241 B1 | 8/2006 | Alspector et al. | |
| 7,158,986 B1 | 1/2007 | Oliver et al. | |
| 7,188,170 B1 * | 3/2007 | Burnley et al. | 709/224 |
| 7,219,148 B2 | 5/2007 | Rounthwaite et al. | |
| 7,246,150 B1 | 7/2007 | Donoho et al. | |
| 7,277,926 B1 | 10/2007 | Lee | |
| 7,421,498 B2 | 9/2008 | Packer | |
| 7,565,445 B2 | 7/2009 | Xie | |
| 7,707,261 B1 * | 4/2010 | Sutton et al. | 709/206 |
| 7,739,253 B1 | 6/2010 | Yanovsky et al. | |
| 7,801,068 B2 * | 9/2010 | Eschbach et al. | 370/312 |
| 8,078,625 B1 | 12/2011 | Zhang et al. | |
| 8,281,361 B1 | 10/2012 | Schepis et al. | |
| 8,296,255 B1 | 10/2012 | Wawda | |
| 8,706,653 B2 | 4/2014 | Kasneci et al. | |
| 8,782,223 B2 | 7/2014 | Xie | |
| 2002/0032772 A1 | 3/2002 | Olstad et al. | |
| 2002/0178223 A1 | 11/2002 | Bushkin | |
| 2003/0172163 A1 | 9/2003 | Fujita et al. | |
| 2004/0030741 A1 | 2/2004 | Wolton et al. | |
| 2004/0042470 A1 * | 3/2004 | Cooper et al. | 370/401 |

(Continued)

FOREIGN PATENT DOCUMENTS

| | | |
|---|---|---|
| GB | 2442286 | 4/2008 |
| GB | 2506450 | 4/2014 |

(Continued)

*Primary Examiner* — Brian P Whipple
(74) *Attorney, Agent, or Firm* — Patterson Thuente Pedersen, P.A.

(57) ABSTRACT

System and method for categorizing a plurality of network resources. Collected properties of a network resource are analyzed to determine applicability of various predefined categories to that network resource. At least one category from among the predefined categories is assigned to that network resource according to a determination of applicability of the at least one category to the network resource. A resource-specific time interval for re-categorizing each one of the network resources is dynamically adjusted based on a plurality of previous categorization results for that network resource, such that different network resources will be associated with correspondingly different re-categorization intervals.

19 Claims, 6 Drawing Sheets

(56) References Cited

U.S. PATENT DOCUMENTS

| | | |
|---|---|---|
| 2004/0103021 A1* | 5/2004 | Scarfe et al. .................... 705/13 |
| 2004/0196486 A1* | 10/2004 | Uchino ....................... 358/1.14 |
| 2004/0196491 A1* | 10/2004 | Uchino ....................... 358/1.15 |
| 2004/0267691 A1* | 12/2004 | Vasudeva .......................... 707/1 |
| 2005/0071741 A1 | 3/2005 | Acharya et al. |
| 2005/0091321 A1 | 4/2005 | Daniell et al. |
| 2005/0192936 A1 | 9/2005 | Meek et al. |
| 2005/0283470 A1 | 12/2005 | Kuntzman et al. |
| 2006/0036728 A1 | 2/2006 | Xie |
| 2006/0168006 A1 | 7/2006 | Shannon et al. |
| 2008/0201722 A1* | 8/2008 | Sarathy ......................... 719/311 |
| 2009/0157640 A1 | 6/2009 | Signorini et al. |
| 2009/0177754 A1 | 7/2009 | Brezina et al. |
| 2009/0234879 A1 | 9/2009 | Xie |
| 2011/0215162 A1 | 9/2011 | Challa et al. |
| 2011/0231402 A1 | 9/2011 | Xie |
| 2012/0311434 A1 | 12/2012 | Skrenta et al. |
| 2013/0014261 A1 | 1/2013 | Millliken et al. |
| 2013/0343378 A1* | 12/2013 | Veteikis et al. ................ 370/389 |
| 2014/0023005 A1* | 1/2014 | Sundaresan et al. ........... 370/329 |

FOREIGN PATENT DOCUMENTS

| | | |
|---|---|---|
| JP | 2006163997 | 6/2006 |
| JP | 2013254446 | 12/2013 |
| WO | WO2009069180 | 6/2009 |

\* cited by examiner

SYSTEM AND METHOD FOR DYNAMIC NETWORK RESOURCE CATEGORIZATION RE-ASSIGNMENT

FIELD OF THE INVENTION

The invention relates generally to information security and, more particularly, to computing systems and associated methods for autonomously categorizing network resources.

BACKGROUND OF THE INVENTION

Network resources that are accessed by computer systems over a computer network include such ubiquitous resources as Websites, file servers, mail servers, and a variety of related services. In dealing with potential malware and other such hazards, a number of technologies have been proposed to categorize the network resources based on their content and other indicia. Such analyses can range from rather superficial examination of names and metadata, to complex and comprehensive assessment of textual, graphical, algorithmic, and multimedia content, as well as links to other resources. The more comprehensive analysis tends to be computationally expensive to process, making it impractical to analyze network resources with a high frequency. One challenge in providing a adequate degree of security from malware or other undesirable content is the fact that network resources are fluid in nature—i.e., subject to frequent updates and changes. A solution is needed that addresses this challenge while providing high-performing categorization of network resource content and associated protection for users accessing such content.

SUMMARY OF THE INVENTION

One aspect of the invention is directed to a system for categorizing a plurality of network resources. the system includes a computing platform interfaced with the computer network, the computing platform including computing hardware of at least one processor, data storage, and input/output facilities, and an operating system implemented on the computing hardware. Instructions, when executed on the computing platform, cause the computing platform to implement a categorization engine and a categorization interval adjustment engine. The categorization engine is configured to analyze collected properties of a network resource to determine applicability of various predefined categories to that network resource and to assign at least one category from among the predefined categories to that network resource according to a determination of applicability of the at least one category to the network resource. The categorization interval adjustment engine is operatively coupled to the categorization engine and configured to dynamically adjust a resource-specific time interval for causing the categorization engine to re-categorize each one of the network resources based on a plurality of previous categorization results for that network resource, such that different network resources will be associated with correspondingly different re-categorization intervals.

In a related aspect of the invention, a machine-implemented method for categorizing a plurality of network resources is provided. According to the method, a computer system autonomously analyzes collected properties of a network resource to determine applicability of various predefined categories to that network resource and assigns at least one category from among the predefined categories to that network resource according to a determination of applicability of the at least one category to the network resource. In addition, the computer system autonomously dynamically adjusts a resource-specific time interval for re-categorizing each one of the network resources based on a plurality of previous categorization results for that network resource, such that different network resources will be associated with correspondingly different re-categorization intervals.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

I Glossary

The following Glossary sets forth definitions of terms used herein. This Glossary is applicable to only the present Application.

"Computer," "Computer system," "Computing system," or "Computing platform"—an electronic device or system of inter-operable electronic devices containing hardware including one or more processors, data storage, input-output devices; and capable of storing and manipulating information according to software instructions carried out by the hardware. It can be one physical machine, or it can be distributed among multiple physical machines, such as by role or function, or by process thread in the case of a cloud computing distributed model. Examples include desktop or mobile personal computers (PCs), smartphones, and tablets, as well as networking devices, such as routers, switches, and the like. Computer systems can be stand-alone devices, or embedded devices that are part of a larger device or system.

"Categorization" of a network resource—the assignment of one or more categories to a network resource.

"Category" and "Sub-category"—grouping or association of network resources with other network resources based on a common attribute, a common property, or a common item of content, each grouping or association having a specific definition. For example, one type of category relates to maliciousness of content on a network resource; another type of category relates to suitability of content for a particular age group. A sub-category is a more specifically-defined category that falls under a more generally-defined category.

"Categorization interval"—a duration of time between successive categorization operations for a given network resource.

"Classes" of categories—defined types of categorizations that may be assigned to a network resource. As examples, "malicious" vs. "safe" categorizations can be considered to be part of a malicious-content class, whereas the "unsuitable" vs. "content-neutral" categorizations can be considered as part of a content-appropriateness class.

"Data storage"—One or more electronic hardware devices that stores data in a physical storage medium. Examples include volatile storage (e.g., random-access memory (RAM), whether static or dynamic), non-volatile storage (e.g., electrically-erasable programmable read-only memory, magnetic disk, etc.).

"Input/output devices" or "Input/output facilities"—Electronic hardware part of a computer system that facilitate the flow of information into, and out of, the computer system. Examples include a network interface device, a monitor, a keyboard, a mouse, a printer, a serial port, etc.).

"Malware" or "Malicious software"—any software used to disrupt computer operation, gather sensitive information, or gain access to a computer system in an unauthorized manner. Malware can appear in the form of code, script, active content, and other software. Examples include, viruses, worms, Trojans, ransom-ware, scare-ware, rootkits, bootkits, spyware, etc.

"Network resource"—A service accessible over a computer network. For example, a Website, a social networking page, or, more generally, any server or virtual server having an IP address. Different network resources can contain correspondingly different types of content; for example, a Web server will contain Web pages that, in turn, will contain html content, images, applets, streaming content, links to other pages, etc.; whereas a file server will contain various files and directories.

"Engine"—a real-world device, component, or arrangement of components implemented using hardware, or as a combination of hardware and software, such as by a microprocessor system and a set of program instructions that adapt the engine to implement the particular functionality, which (while being executed) transform the microprocessor system into a special-purpose device. A engine can also be implemented as a combination of the two, with certain functions facilitated by hardware alone, and other functions facilitated by a combination of software-controlled hardware. In certain implementations, at least a portion, and in some cases, all, of a engine can include the processor(s) of one or more computers that execute an operating system, system programs, and application programs, while also implementing the engine using multitasking, multithreading, distributed (e.g., cluster, peer-peer, cloud, etc.) processing where appropriate, or other such techniques. In addition, a engine can itself be composed of more than one sub-engines, each of which can be regarded as a engine in its own right.

"Processor"—Electronic hardware part of a computer system that carries out the instructions of a computer program by performing basic arithmetical, logical, temporary storage, and input/output operations of the system. Typically, a processor is implemented as a microprocessor (i.e., integrated on a single chip), though this definition includes processor circuits that are implemented on multiple interconnected integrated circuits. Modern-day processors typically include multiple processing cores and can distribute workload among the multiple processing cores.

"Proxy," "Proxy server," "Proxy service"—An intermediary process running on a local computer system or on a distinct computer system or network device (e.g., switch, router, etc.), that functions as an intermediary between an application of the local computer system that access a remote computer over a computer network such as the Internet (for example, a Web browser). Proxies assist with establishing connections between the local and remote computer systems, and can provide a variety of data processing operations for the benefit of the local computer system. Data flow is passed through the proxy, which can monitor, filter, and redirect the data packets as needed according to the beneficial service to be provided by the proxy. For instance, to protect users working on local computer systems, a proxy can analyze the connections to network addresses, and block or redirect network traffic if a connection is suspected of exposing the user's computer system to undue risk (such as the risk of malware or hacker attack). Another example of the data processing operations performed by a proxy is storing copies of frequently-used Web pages (caching) to provide faster loading of those pages.

"Relatively basic analysis" of a network resource—compared to the relatively comprehensive analysis, a more simplified, less computationally-intensive, analysis of network resource content. For example, reading, and computationally comparing against predefined categorization criteria, only certain items of data, such as the name of the network resource, the address of the network resource, and metadata stored thereon, such as meta tags used for storing the information intended for browsers and search systems.

"Relatively comprehensive analysis" of a network resource—compared to the relatively basic analysis, a more detailed, computationally-intensive, analysis of network resource content. For example, reading, parsing relevant content, and computationally comparing the content against predefined categorization criteria, where the relevant content stored on each network resource subject to categorization includes any hosted files for download, streamed content, and links to pages on the same network resource, or links to other network resources. In a related example, additional content is examined, including content of certain linked resources.

Figure 1:
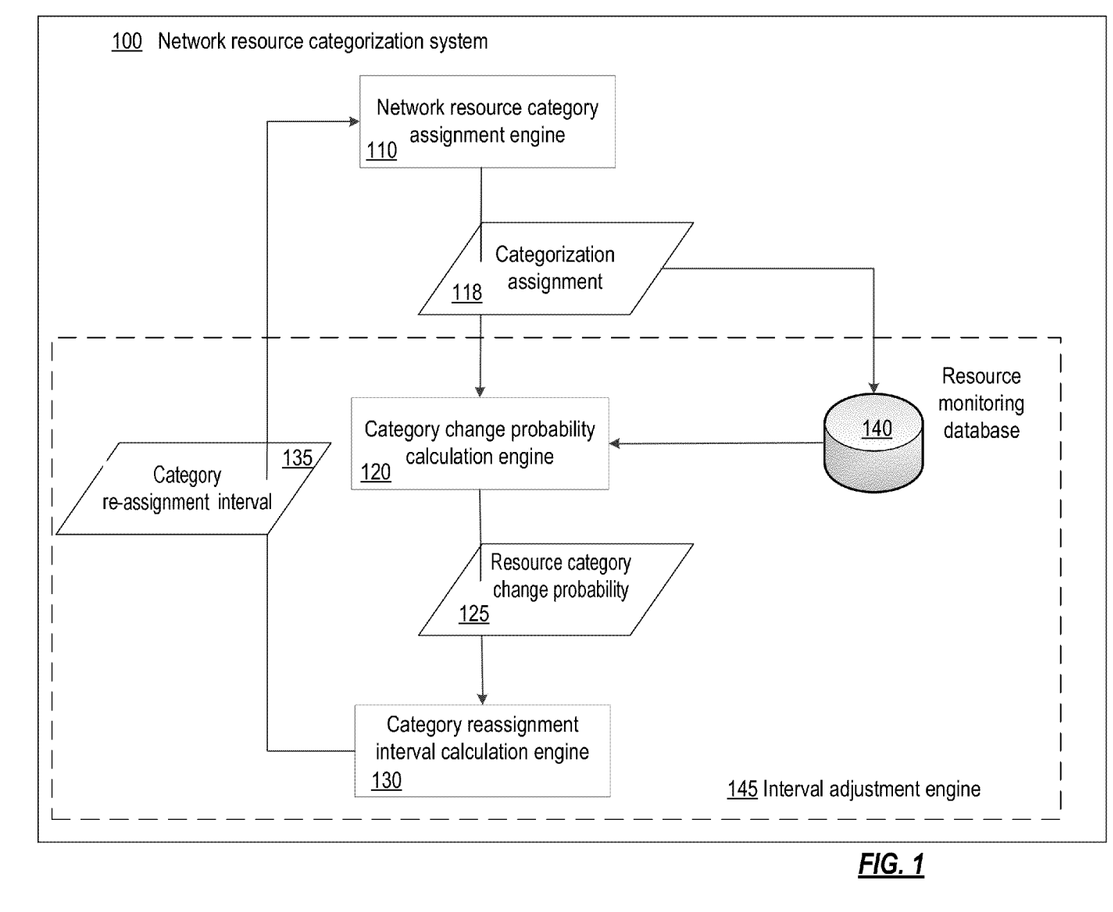
FIG. 1 is a block diagram illustrating the structure of an exemplary system for categorizing network resources according to one embodiment.
Figure 3:
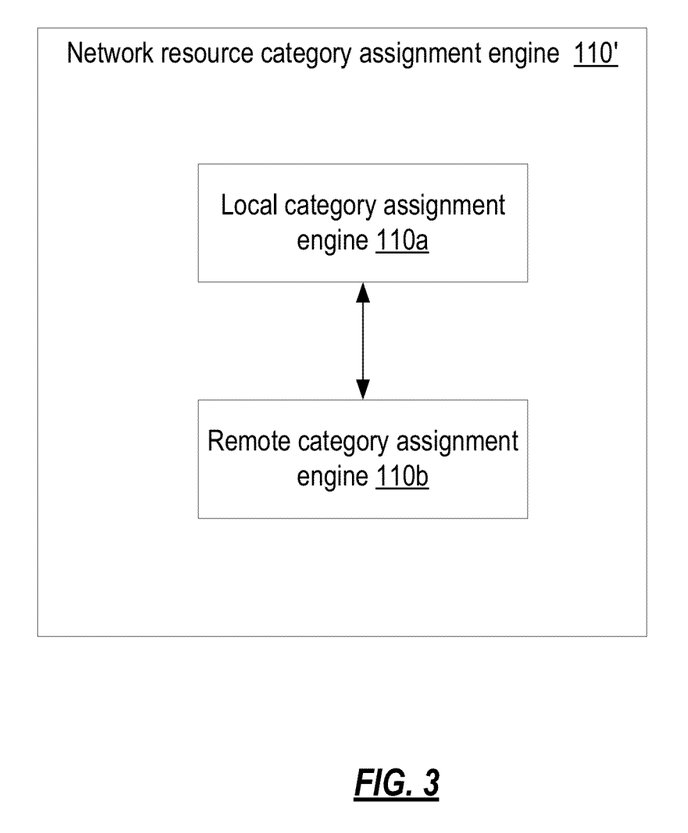
FIG. 3 is a diagram illustrating a multi-part network resource category assignment engine according to one embodiment.

"Means for analyzing collected properties of a network resource to determine applicability of various predefined categories to that network resource and assigning at least one category from among the predefined categories to that network resource"—network resource category assignment engine 110 or 110' according to any one (or combination of) their various embodiments described below, or any of their structural equivalents.

"Means for dynamically adjusting a resource-specific time interval for re-categorizing each one of the network resources"—category change probability engine 120 according to any one (or combination of) its various embodiments described below, or any of its structural equivalents, and category reassignment interval calculation engine 130 according to any one (or combination of) its various embodiments described below, or any of its structural equivalents.

II Description of Preferred Embodiments

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

FIG. 1 is a block diagram illustrating the structure of an exemplary system 100 for categorizing network resources. The network resource category assignment engine 110 assigns a categorization of the content of a network resource. A network resource, in the present context, can be a Website, a social networking page, or, more generally, any server or virtual server having an IP address. Different network resources can contain correspondingly different types of content. For example, a Web server will contain Web pages that, in turn, will contain html content, images, applets, streaming content, links to other pages, etc.; whereas a file server will contain various files and directories.

During processing, a network resource can be checked using various techniques. For example, suitable antivirus, anti-phishing analysis, or parental control content analysis engines can be employed. In one type of embodiment, the category assignment relates to information security—such as checking for malicious content, e.g., antivirus checking using signature analysis; an anti-phishing checking to analyze the behavior of active control elements (for example, information input controls), etc. In a related embodiment, the categorization relates to age-appropriateness of content, as relevant for parental controls. As a result of the check, a set of network resource categories is assigned, which reflect the classification of the network resource content into one or more pre-defined categories.

The system includes various engines, each of which is constructed, programmed, configured, or otherwise adapted, to autonomously carry out a function or set of functions. The term engine as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular autonomous functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine can be physically realized in any of a variety of suitable physical and logical configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As depicted in FIG. 1, category assignment engine 110 produces categorization assignment 118 for each categorized network resource. In one embodiment, as an example, categorization assignment 118 includes one or more categories such as:

"malicious" (able to cause harm to the computer or to the user's data) or

"safe"

"unsuitable" for viewing by some users (contains adult content, scenes of violence, information about smoking, alcohol consumption, drug use, etc.), or "content-neutral" (suitable for viewing by all users).

Certain categories can be assigned at the same time to a given network resource. For instance, in the context of the present example, a network resource can be both, "safe", and "unsuitable" for some users. Other categories are mutually-exclusive: a network resource cannot be both, "malicious," and "safe;" likewise, a resource cannot be both, "unsuitable," and "content-neutral."

In one embodiment, categories can be organized separate classes. For instance, "malicious" vs. "safe" categorizations can be considered to be part of a malicious-content class, whereas the "unsuitable" vs. "content-neutral" categorizations can be considered as part of a content-appropriateness class. In one embodiment utilizing multiple classes of categories, no two categories of a common class can be assigned to a network resource; however, additional categories from another class can be assigned concurrently.

In the present description, two classes of categories are presented as illustrative examples. It should be understood that various embodiments of the invention include a network resource category assignment engine 110 that can work with one class of categories, two classes of categories, or three or more classes of categories.

In a related embodiment, each category can itself be a generalization of more particular sub-categories. For instance, in the malicious-content class of categories, the "malicious" category can include any of the following sub-categories:

virus,
phishing-related content,
bot,
rootkit,
spyware,
trojan,
worm.

The various sub-classes can be assigned by a variety of distinct engines—for instance, a trojan, virus, or rootkit can be detected by an antivirus engine; whereas phishing-related content can be detected by an email content filter engine; and a worm can be detected by a firewall.

Likewise, the "unsuitable" category can include various sub-classes, such as:

adult content (i.e., of a pornographic or sexual nature),
alcohol, tobacco, drugs,
violence,
obscene language,
weapons.

In a related embodiment, each sub-class can be graded by degree—for instance:

adult-only content,
inappropriate for children under 17,
inappropriate for children under 15,
inappropriate for children under 12, inappropriate for children under 10,
appropriate for all ages.

In this embodiment, whether a given subclass is made a member of a given class depends on the grade, and on a set threshold. For instance, parental control settings applied in a parental control engine can specify that any content that is inappropriate for children ages 12 and under belongs in the "unsuitable" category.

Over time, content on the network resources can change and, accordingly, there is a need to update the categorization assignment for each network resource. As discussed above, category reassignment for a multitude of network resources can be a computationally-expensive undertaking, which can decrease the performance of computer systems and adversely affect the user experience for users of those computer systems. To address this problem, network resource category change probability calculation engine 120 and category redefinition interval calculation engine 130 work together to compute category redefinition interval 135 for use by network resource category assignment engine 110. Collectively, engines 120, 130, and 140 can be considered as parts of a categorization interval adjustment engine. By operation of engines 120 and 130, category redefinition interval 135 is dynamically adjusted a resource-specific time interval for causing the categorization engine 110 to re-categorize each one of the network resources based on a plurality of previous categorization results for that network resource. Resource specificity in the present context means that different network resources will be associated with correspondingly different re-categorization intervals.

According to the embodiment depicted in FIG. 1, category change probability calculation engine 120 obtains the categorization assignment 118 and category assignment data history stored in database 140 for each network resource and, based thereupon, computes a measure of probability 125 that indicates the chance that the categorization for each resource subject to categorization will need to be changed. Category reassignment engine 130 uses the resource category change probability 125 to compute a new category redefinition interval 135 for each corresponding resource. In turn, category assignment engine 110 computes the categorization for each resource according to the resource-specific interval 135. Each of engines 110, 130, and 130 are described in greater detail below.

Figure 2:
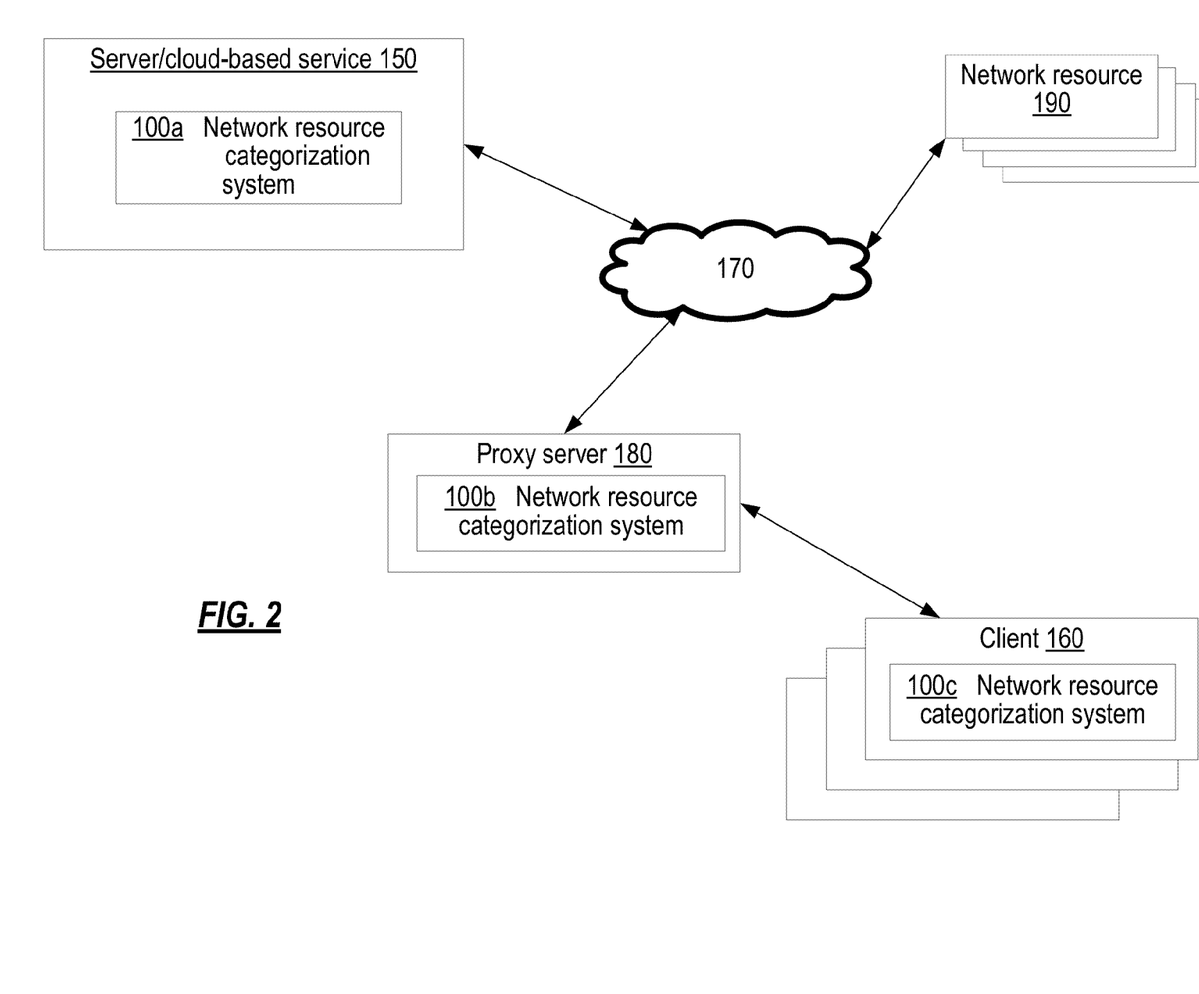
FIG. 2 is a block diagram illustrating various implementations of the system of FIG. 1 according to various embodiments.

The network resource categorization system 100 can be implemented at one or more various points in a computer network to categorize each of a plurality of network resources 190. FIG. 2 is a block diagram illustrating various implementations according to contemplated embodiments. Categorization system 100a operates on a network server or a cloud service 150. In the cloud service case, categorization system 100a is distributed over multiple distinct servers, but is seen from the client side as a single service. In another embodiment, categorization assignment system 100b is implemented on proxy server 180, which is used by one or more client devices 160 to access computer network 170 (which can be a private network such as a corporate network, or a public network such as the Internet). Categorization system 100c is implemented on each client device 160, which can be a personal computer or mobile device.

In a related embodiment, more than one instance of categorization system 100 is used at two or more locations. For example, there can be a server-side system 100a, and a set of client-side systems 100c, providing similar functionality. In a related embodiment, all three types of categorization systems, 100a, 100b, and 100c, are used together.

In a related embodiment, only a portion of categorization system 100 is implemented at one or more types of locations, with the remaining portion implemented at another location. For example, network resource category assignment engine 110 can be implemented on one server, while category change probability calculation engine 120, category reassignment interval calculation engine 130, and resource monitoring database 140 implemented on a different server. Similarly, there can be multiple versions of category assignment engine 110 implemented at various locations. FIG. 3 illustrates one such example. Network resource category assignment engine 110' in this example includes two components operating remotely from one another: local category assignment engine 110a, and remote category assignment engine 110b. The local category assignment engine 110a can be implemented on a client device, whereas remote category assignment engine 110b can be implemented on a server.

In one such embodiment, where there is both, a server-side implementation and a client-side implementation of resource category assignment engine 110', different categorization tasks are allocated on the client side and on the server side. In one example of this embodiment, the network-side resource category assignment engine can perform a comprehensive analysis of network resources to produce a full categorization, whereas the client-side resource category assignment engine performs a more basic analysis to produce a preliminary or interim categorization.

The more comprehensive analysis performed on the server side, in one instance, includes reading, parsing relevant content, and computationally comparing the content against predefined categorization criteria, where the relevant content stored on each network resource subject to categorization includes any hosted files for download, streamed content, and links to pages on the same network resource, or links to other network resources. In a related example, additional content is examined, including content of certain linked resources.

In one embodiment, when the basic categorization is performed on the user's device, the categories are assigned in response to each instance when the user (or program operating on behalf of the user) tries to access the network resource. The basic categorization performed on the client side, in one example, consists essentially of reading, and computationally comparing against predefined categorization criteria, only certain items of data, such as the name of the network resource, the address of the network resource, and metadata stored thereon, such as meta tags used for storing the information intended for browsers and search systems. Meta tags are usually specified in the heading of an HTML document and can contain, for example, information about the author of the network resource and about the frequency of its updates.

In a related embodiment, one or both of the client-side and server-side category assessment engines share their categorizations with the other. For example, local category assignment engine 110a working on a client-side computer system, performs a comparative assessment between its own categorization assignment, and the results of network resource categorization of the resource in question received from remote (network-side) resource category assignment engine 110b working on a server or as a cloud service. In this case, if the categories assigned by a server-side category assignment engine 110b are different from the categories assigned by the local category assignment engine 110a, the categories assigned on the server-side engine, 110b, will prevail as the more correct categorization. Accordingly, upon the client-side category assignment engine 110a receiving categorization information from the server-side category assignment engine 110b, local category assignment engine 110a proceeds to compare that information, for each categorized network resource, against its own (locally-produced) categorizations. In response to any detected differences in categorization for each network resource, the local category assessment engine replaces its locally-produced categorization(s) with the remotely-produced categorization(s).

In a related embodiment, if a situation occurs when the categories of any network resource assigned locally by the category assignment engine 110a of any client device have any significant differences from the categories assigned by the remote category assignment engine 110b (for example, the number of discrepancies between the categories exceeds a specified limit over a time period), it can be assumed that the network resource categories have changed. In this case, remote category assignment engine 110b is notified of the need to initiate a complete analysis to re-categorize the particular network resource.

Figure 4:
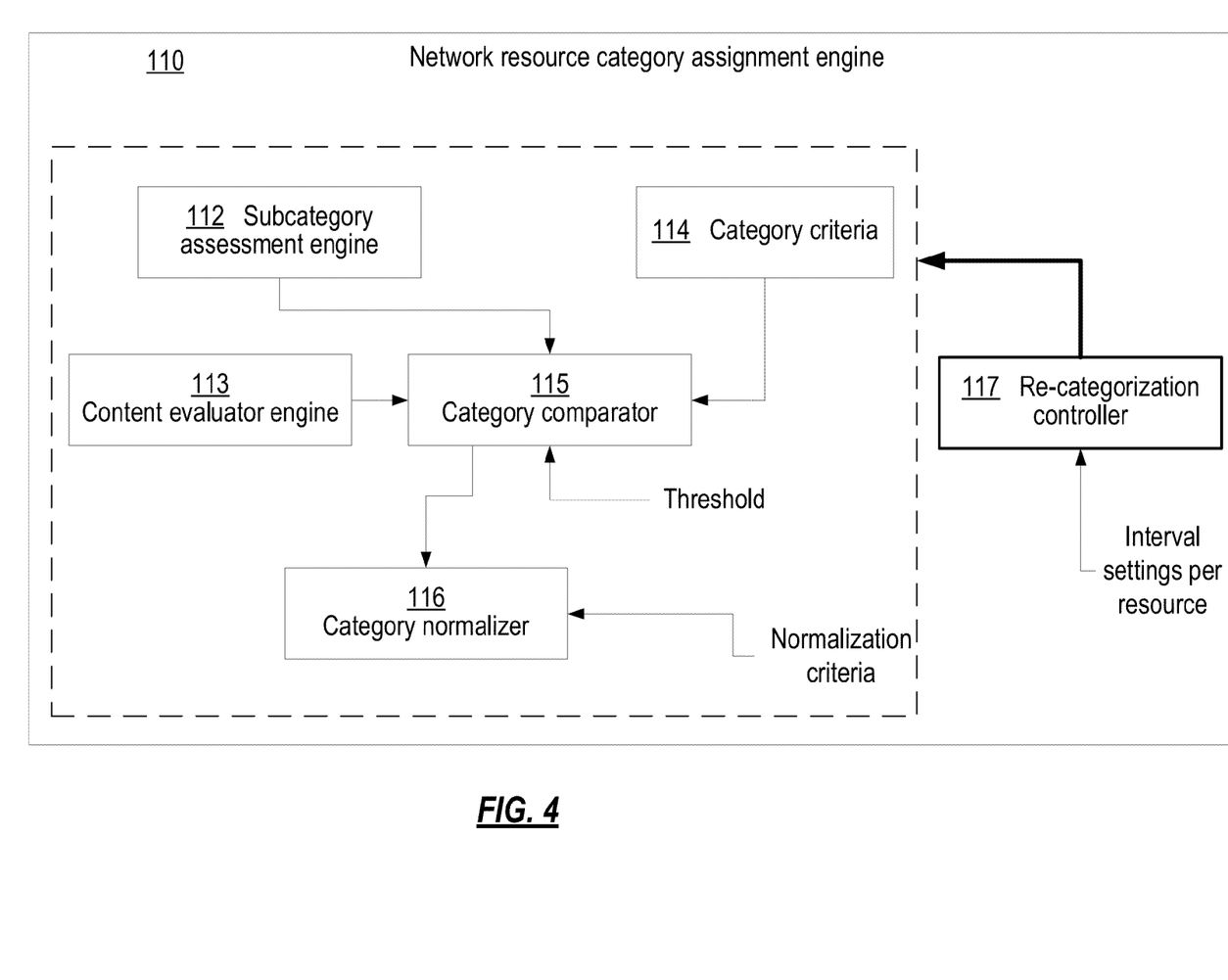
FIG. 4 is a block diagram illustrating an exemplary set of components of a network resource category assignment engine according to one embodiment.

Turning now to FIG. 4, a more detailed example of network resource category assignment engine is provided. FIG. 4 is a block diagram illustrating an exemplary set of components of network resource category assignment engine 110 according to one embodiment. Subcategory assessment engine 112 obtains sub-categorizations that are assigned by various security suite components, and processes the sub-category assignments to determine the category or categories with which each sub-class might correspond. Content evaluator engine 113 performs an independent content assessment of a network resource. In various embodiments, content evaluator engine 113 can include one or more artificial intelligence (AI) engines, such as an artificial neural network, a decision tree engine, a clustering engine, a classification engine, a linguistic analysis engine, a pattern recognition engine, or any suitable technology that autonomously assesses the content of a network resource. In a more basic embodiment, Content evaluator engine 113 applies preconfigured logical rules to certain content items associated with each network resource in order to make a preliminary content evaluation assessment (for example, checking for the presence of certain words, phrases, or combinations, in a Web page's title, metadata, or content). Content evaluator engine 113 operates in place of, or in addition to, subcategory assessment engine 112 according to various embodiments.

Category comparator engine 115 reads pre-defined category criteria 114, and compares it against the subcategory assessment from subcategory assessment engine 112, and content assessment from content evaluator engine 113. In addition, category comparator engine 115 applies one or more thresholds to arrive at a set of categorizations for each network resource in question. As a result of its operation, category comparator engine 115 produces a set of one or more categories that are assigned to the network resource in question.

In a related embodiment, category normalizer engine 116 distills the categorization to a simple binary expression, e.g., in which one of two states is assigned to a network resource: "0"—meaning an undesirable category is absent; and "1"—meaning an undesirable category is present. The normalization is based on normalization criteria that can include a list of desirable or undesirable categories, for example.

Re-categorization controller engine 117 obtains a regularly-updated list of categorization intervals that has each category re-assignment interval for each resource, checks the passage of time against each interval setting and, upon the passage of the corresponding category-re-assignment interval for each resource, initiates a re-categorization operation utilizing engines 112-116. Notably, each individual network resource subject to categorization can have its own individually-determined re-categorization interval.

Referring again to FIG. 1, in one embodiment, the network resource category assignment engine 110 saves category assignment data 118 for each categorized network resource to resource monitoring database 140. As one example, category assignment data can contain:
the network resource ID,
the monitoring time (the moment of time when the categories were assigned),
the categories assigned to the network resource and, optionally, a normalized binary categorization.

In a related embodiment, database 140 also stores the history of changes of network resource categories that are currently assigned, and that were previously assigned.

The network resource category change probability calculation engine 120, based on the current categorization assignment 118, and on history received from resource monitoring database 140, calculates the probability of change of network resource categories. In one example embodiment, for the two possible states, the probability of a transition from one state to the other is determined by the ratio of the time of being in the new state to the total network resource operation monitoring time. For instance:

$$P0 = \frac{T0}{T0 + T1}$$
$$P1 = \frac{T1}{T0 + T1}$$

Where:
P0 is the probability of transition of the network resource to the "0" state;
P1 is the probability of transition of the network resource to the "1" state;
T0 is the total time the network resource is in the "0" state;
T1 is the total time the network resource is in the "1" state.

The calculation of probabilities uses the network resource category assignment data 118 provided by the network resource category assignment engine 110. This data is used by engine 120 to determine what probability is to be relied upon when calculating the interval for re-assignment of network resource categories.

In a basic embodiment, the following rule is applied: the probability of transition to the opposite state is taken into account. For example, if the last state of the network resource is "1", it is necessary to take into account the probability of transition of the resource to the "0" state, and, optionally, vice-versa. For example, if the network resource was monitored for 1000 hours and contained any of the undesirable categories for only 100 hours, the probability of transition to a new state is calculated as follows:

If the resource does not contain undesirable categories at the current moment, the probability of transition to a state with undesirable categories is $$P = \frac{T1}{T0 + T1} = \frac{100}{100 + 900} = 0.1$$

The network resource category re-assignment interval calculation engine 130, on the basis of the state change probability calculated by the category change probability calculation engine 120, calculates the interval for re-assignment of the categories (the time that has to pass until the re-assignment categorization) of the network resource, using the following formula:

$$T = T\max - \frac{P(T\max - T\min)}{K}$$

Where:

P is the probability of the system's transition to the opposite state;

Tmax is the maximum interval for re-assignment of network resource categories (for example, 2 weeks);

Tmin is the minimum interval for re-assignment of network resource categories (for example, 1 hour); and K is a marginal diversity coefficient, which can be pre-defined, for example, empirically during the launch of the system 100, and which is used to indicate a threshold condition when the minimum resource category re-assignment interval is to be chosen notwithstanding any other circumstances. In one example, K=0.3; accordingly, if the category change probability exceeds 0.3, the minimal category re-assignment interval is selected, which corresponds to a maximum category reassignment frequency.

In one embodiment, the network resource category re-assignment interval is limited by predefined maximum and minimum limit values. For example, the minimum interval can be 1 hour, the maximum interval can be 2 weeks.

In a related embodiment, for network resources having a "malicious" category assigned to it, the category re-assignment interval will be automatically set to the minimum possible interval.

The network resource category re-assignment interval calculation engine 130 sends the calculated network resource category re-assignment interval 135 to the network resource category assignment engine 110, which, for each network resource subject to categorization, performs a re-assignment of the network resource categories in response to expiry of the corresponding category re-assignment interval.

For example, if the network resource was monitored for 1000 hours and the resource contained undesirable categories for only 100 hours and does not currently contain any undesirable categories, the probability of transition to the opposite state is 0.1, and, consequently, the interval for the next definition of categories is calculated as follows:

$$T = T\max - \frac{P(T\max - T\min)}{K} = 24*14 - \frac{0.1(24*14-1)}{0.3} = 224.3 \text{ hr}$$

Figure 5:
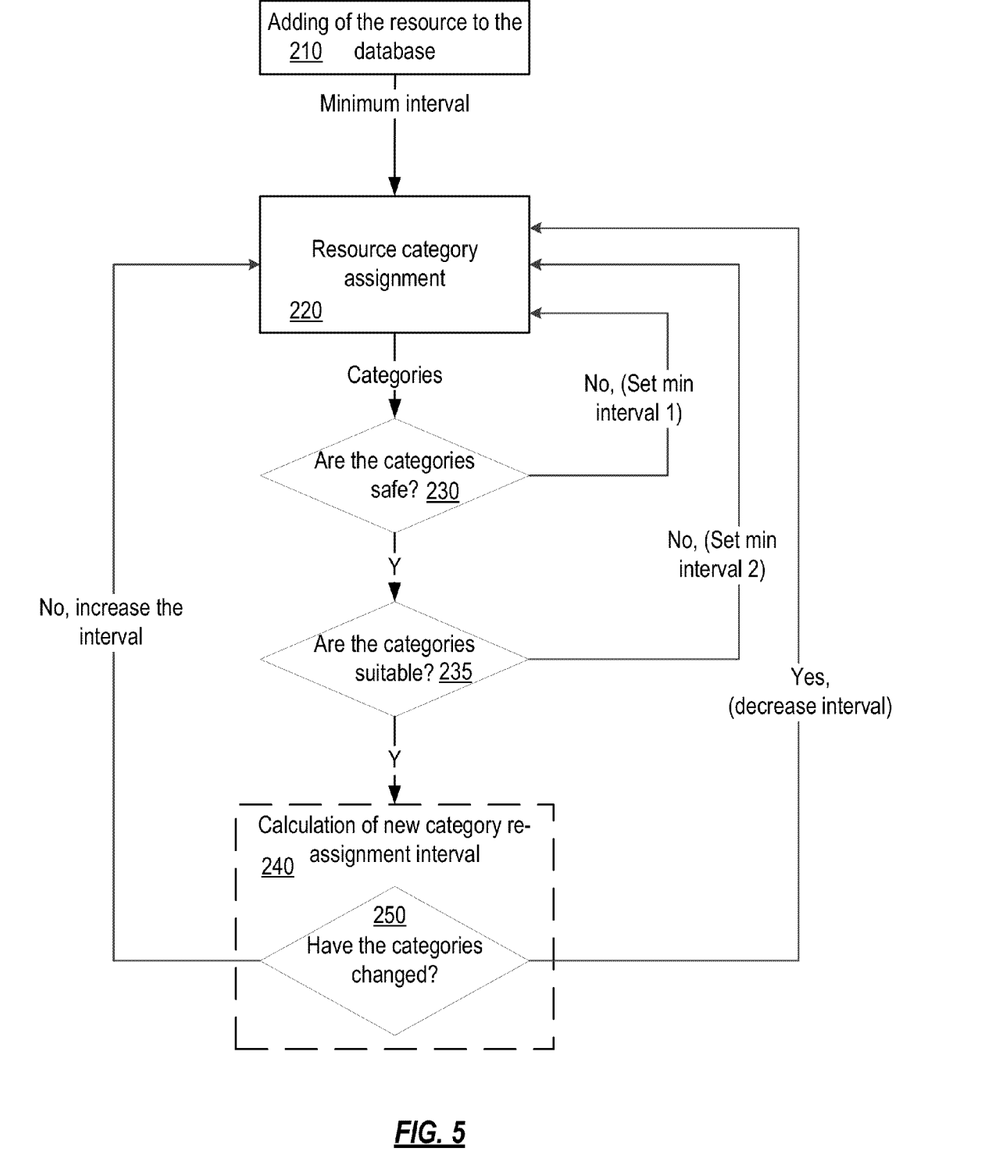
FIG. 5 is a flow diagram illustrating an operational algorithm of a system for categorizing network resources having dynamic, network resource-specific, re-categorization intervals according to one embodiment.

FIG. 5 is a flow diagram illustrating an operational algorithm of a system for categorizing network resources having dynamic, network resource-specific, re-categorization intervals according to one embodiment.

At 210, a network resource to be categorized is added to the database 140 using the network resource category assignment engine 110, and, by initial operation of engine 110, the category or categories are assigned at 220 by the network resource category assignment engine 110. Initially, a minimum possible interval for the resource category assignment is assigned, in order to quickly assess the variability of the categories. After a second assignment of the categories, it sufficient history is available from which it becomes possible to make an assessment as to the variability of the categories based on category assignment statistics and associated durations, and to calculate the interval to be used for the subsequent assignment of categories.

At decision 230, the system determines if the network resource category assignment engine 110 assigned any one of the malicious categories to the network resource, in which case the network resource category re-assignment interval calculation engine 130 sets the resource category re-assignment interval as the minimum possible interval (which is predefined).

If decision 230 finds that there are no "malicious" categories currently assigned, the process proceeds to decision 235, in which (optionally) the system checks for content suitability. If the content of the network resource is "unsuitable," the interval is set to a predefined minimum value. As depicted, the minimum interval values can be different for (1) the case where the network resource has "malicious" content, and (2) the case where the network resource has safe but "unsuitable" content. In another embodiment, the minimum intervals can be the same for cases (1) and (2).

In yet another embodiment, there is no suitability-related categorization, so decision 235 is simply omitted. In still another embodiment, there is a suitability-related categorization, but the suitability state or history is not a factor in determining the interval for re-categorization, so again, decision 235 can be omitted.

At 240, a new categorization interval is set based on the computed probability of change to an undesirable category. The undesirable category can be hazard-related, or suitability-related, or some combination of these two types of categorizations according to one type of embodiment. Accordingly, if "undesirable" categories were found on the network resource or no categories were found at all, the network resource category re-assignment interval calculation engine 130 calculates the probability of change of the categories 240 using the category change probability calculation engine 120. Then, on the basis of the calculated category change probability, the interval for the next re-assignment of the network resource categories is calculated.

In a particular embodiment, as depicted at decision 250, if the categories on the network resource have not changed, the interval for the re-assignment of the network resource categories tends to increase.

In a related embodiment, as depicted, if the categories have changed to some extent (this exemplary algorithm presumes there is some change in categorization, but one that does not amount to the network resource being deemed "malicious" or wholly "unsuitable"), the interval decreases. In a related example, the nature of categorization change that does not amount to a malicious or unsuitable content determination utilizes sub-categorizations and thresholding, with the extend of categorization change not exceeding any applicable threshold to meet the "malicious" or "unsuitable" criteria.

Figure 6:
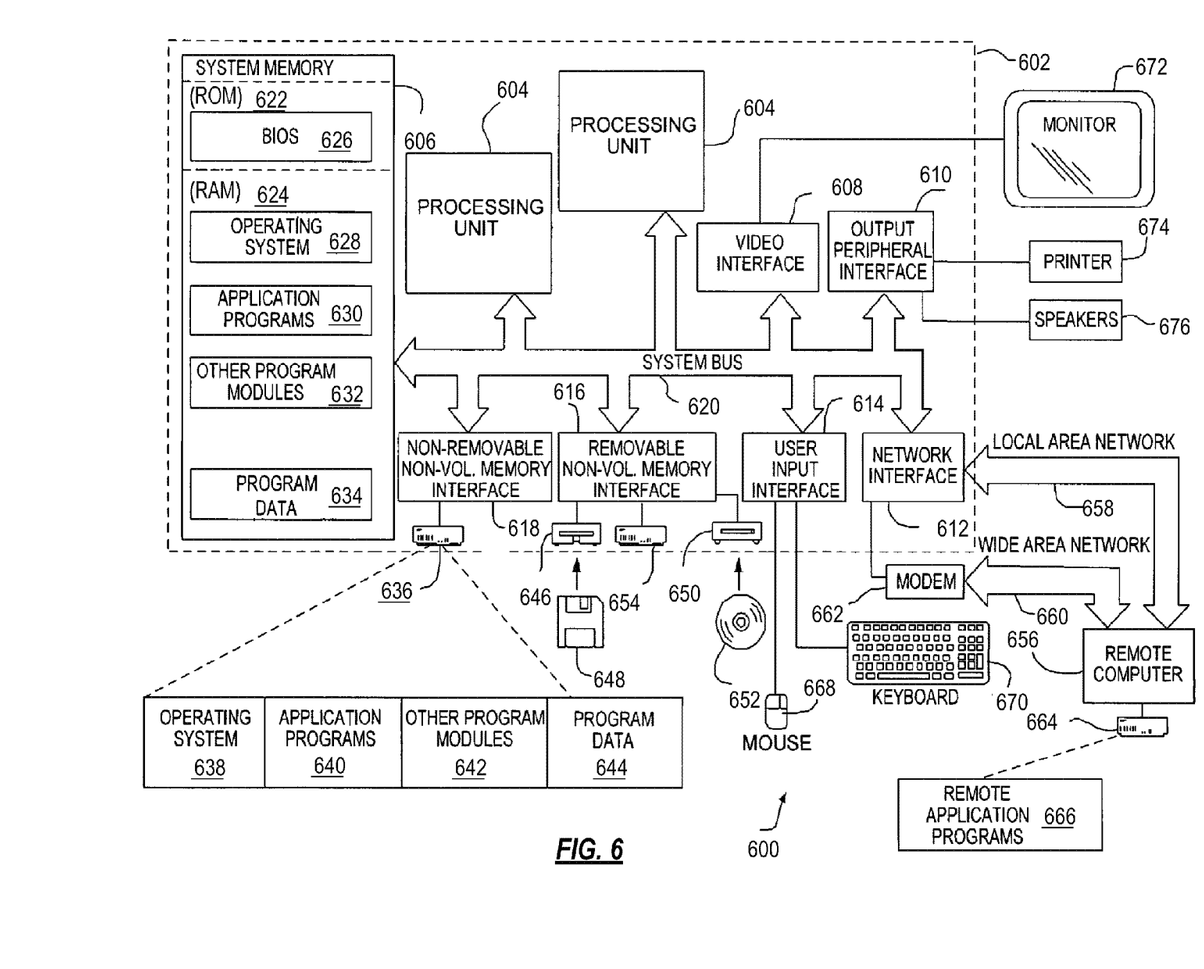
FIG. 6 is a diagram illustrating in greater detail a computer system on which aspects of the invention may be implemented according to various embodiments.

FIG. 6 is a diagram illustrating in greater detail a computer system 600 on which aspects of the invention as described herein may be implemented according to various embodiments. The computer system 600 may include a computing device such as a personal computer 602. The personal computer 602 includes one or more processing units 604, a system memory 606, a video interface 608, an output peripheral interface 610, a network interface 612, a user input interface 614, removable 616 and non-removable 618 memory interfaces and a system bus or high-speed communications channel 620 coupling the various components. In various embodiments, the processing units 604 may have multiple logical cores that are able to process information stored on computer readable media such as the system memory 606 or memory attached to the removable 616 and non-removable 618 memory interfaces 618. The computer 602 system memory 606 may include non-volatile memory such as Read Only Memory (ROM) 622 or volatile memory such as Random Access Memory (RAM) 624. The ROM 622 may include a basic input/output system (BIOS) 626 to help communicate with the other portion of the computer 602. The RAM 624 may store portions of various software applications such as the operating system 628, application programs 630 and other program engines 632. Further, the RAM 624 may store other information such as program or application data 634. In various embodiments, the RAM 624 stores information that requires low-latencies and efficient access, such as programs and data being manipulated or operated on. In various embodiments RAM 624 comprises Double Data Rate (DDR) memory, Error Correcting memory (ECC) or other memory technologies with varying latencies and configurations such as RAMBUS or DDR2 and DDR3. In this way, in various embodiments, the system memory 606 may store the input data store, access credential data store, operating memory data store, instruction set data store, analysis result data store and the operating memory data store. Further, in various embodiments, the processing units 604 may be configured to execute instructions that limit access to the aforementioned data stores by requiring access credential before access to the information is granted.

The removable 616 and non-removable 618 memory interfaces may couple the computer 602 to disk drives 636 such as SSD or rotational disk drives. These disk drives 636 may provide further storage for various software applications such as the operating system 638, application programs 640 and other program engines 642. Further, the disk drives 636 may store other information such as program or application data 644. In various embodiments, the disk drives 636 store information that doesn't require the same low-latencies as in other storage mediums. Further, the operating system 638, application program 640 data, program engines 642 and program or application data 644 may be the same information as that stored in the RAM 624 in various embodiments mentioned above or it may be different data potentially derivative of the RAM 624 stored data.

Further, the removable non-volatile memory interface 616 may couple the computer 602 to magnetic portable disk drives 646 that utilize magnetic media such as the floppy disk 648, Iomega® Zip or Jazz, or optical disk drives 650 that utilize optical media 652 for storage of computer readable media such as Blu-Ray®, DVD-R/RW, CD-R/RW and other similar formats. Still other embodiments utilize SSD or rotational disks housed in portable enclosures 54 to increase the capacity of removable memory.

The computer 602 may utilize the network interface 612 to communicate with one or more remote computers 656 over a local area network (LAN) 658 or a wide area network (WAN) 660. The network interface 612 may utilize a Network Interface Card (NIC) or other interface such as a modem 662 to enable communication. The modem 662 may enable communication over telephone lines, coaxial, fiber optic, powerline, or wirelessly. The remote computer 656 may contain a similar hardware and software configuration or may have a memory 664 that contains remote application programs 666 that may provide additional computer readable instructions to the computer 602. In various embodiments, the remote computer memory 664 can be utilized to store information such as identified file information that may be later downloaded to local system memory 606. Further, in various embodiments the remote computer 656 may be an application server, an administrative server, client computers, or a network appliance.

A user may enter information to the computer 602 using input devices connected to the user input interface 614 such as a mouse 668 and keyboard 670. Additionally, the input device may be a trackpad, fingerprint scanner, joystick, barcode scanner, media scanner or the like. The video interface 608 may provide visual information to a display such as a monitor 672. The video interface 608 may be an embedded interface or it may be a discrete interface. Further, the computer may utilize a plurality of video interfaces 608, network interfaces 612 and removable 616 and non-removable 618 interfaces in order to increase the flexibility in operation of the computer 602. Further, various embodiments utilize several monitors 672 and several video interfaces 608 to vary the performance and capabilities of the computer 602. Other computer interfaces may be included in computer 602 such as the output peripheral interface 610. This interface may be coupled to a printer 674 or speakers 676 or other peripherals to provide additional functionality to the computer 602.

Various alternative configurations and implementations of the computer 602 are within the spirit of the invention. These variations may include, without limitation, additional interfaces coupled to the system bus 620 such as universal serial bus (USB), printer port, game port, PCI bus, PCI Express or integrations of the various components described above into chipset components such as the northbridge or southbridge. For example, in various embodiments, the processing unit 604 may include an embedded memory controller (not shown) to enable more efficient transfer of data from the system memory 606 than the system bus 620 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for categorizing a plurality of network resources, the system comprising:
   a computing platform interfaced with a computer network, the computing platform including computing hardware of at least one processor, data storage, and input/output facilities, and an operating system implemented on the computing hardware; and
   instructions that, when executed on the computing platform, cause the computing platform to implement:
   a categorization engine configured to analyze collected properties of a network resource to determine applicability of various predefined categories to that network resource and to assign at least one category from among the predefined categories to that network resource according to a determination of applicability of the at least one category to the network resource; and
   a categorization interval adjustment engine operatively coupled to the categorization engine and configured to dynamically adjust a resource-specific time interval for causing the categorization engine to re-categorize each one of the network resources based on a plurality of previous categorization results for that network resource, wherein different network resources are associated with correspondingly different re-categorization intervals.

2. The system of claim 1, wherein the categorization interval adjustment engine includes a network resource category change probability calculation engine operatively coupled to a category redefinition interval calculation engine, wherein the network resource category change probability calculation engine is configured to read categorization history for each network resource, including the plurality of previous categorization results, and, based on the categorization history, to compute a probability of categorization change, and wherein the category redefinition interval calculation engine is configured to compute a new network resource-specific re-categorization interval based on the probability of categorization change.

3. The system of claim 2, wherein the probability of categorization change is based on a ratio of durations during which various categories have been assigned to the network resource.

4. The system of claim 2, wherein the new network resource-specific re-categorization interval is bound by a maximum limit and a minimum limit.

5. The system of claim 1, wherein the various predefined categories include a category indicating malicious content present in a given network resource, and wherein the categorization interval adjustment engine is configured to dynamically adjust the resource-specific time interval, wherein:
   in response to a categorization of malicious content in the network resource, the time interval is reduced by a first increment; and
   in response to a categorization of non-malicious content in the network resource, the time interval is increased by a second increment;
   wherein the first increment is larger than the second increment.

6. The system of claim 1, wherein the various predefined categories include a category indicating a suitability of content present in a given network resource, and wherein the categorization interval adjustment engine is configured to dynamically adjust the resource-specific time interval based on the category indicating the suitability of content.

7. The system of claim 1, wherein the various predefined categories include:
   a first category indicating malicious content present in a given network resource; and
   a second category indicating a suitability of content present in a given network resource;
   wherein the categorization interval adjustment engine is configured to dynamically adjust the resource-specific time interval based on a combination of the first and the second categories.

8. The system of claim 1, wherein the various predefined categories include:
   a first category indicating malicious content present in a given network resource; and
   a second category indicating a suitability of content present in a given network resource;
   wherein the categorization interval adjustment engine is configured to dynamically adjust the resource-specific time interval based on the first category but not the second category.

9. The system of claim 1, wherein the categorization engine includes a first portion operating on one of a plurality of local computer systems, and a second portion operating on a server situated remotely from any of the local computer systems, wherein the first portion is configured to perform a first categorization of a given network resource based on relatively basic analysis of the given network resource, and wherein the second portion is configured to perform a second categorization of the given network resource based on relatively comprehensive analysis of the given network resource.

10. The system of claim 9, wherein the second portion is configured to perform a re-categorization of the given network resource in response to a determined discrepancy between the first categorization and the second categorization.

11. A machine-implemented method for categorizing a plurality of network resources, the method comprising:
    by a computer system, autonomously analyzing collected properties of a network resource to determine applicability of various predefined categories to that network resource and assigning at least one category from among the predefined categories to that network resource according to a determination of applicability of the at least one category to the network resource; and
    by a computer system, autonomously dynamically adjusting a resource-specific time interval for re-categorizing each one of the network resources based on a plurality of previous categorization results for that network resource, wherein different network resources are associated with correspondingly different re-categorization intervals.

12. The method of claim 11, wherein dynamically adjusting a resource-specific time interval includes:
    reading categorization history for each network resource, including the plurality of previous categorization results;
    based on the categorization history, computing a probability of categorization change; and
    computing a new network resource-specific re-categorization interval based on the probability of categorization change.

13. The method of claim 12, wherein the probability of categorization change is based on a ratio of durations during which various categories have been assigned to the network resource.

14. The method of claim 12, wherein the new network resource-specific re-categorization interval is bound by a maximum limit and a minimum limit.

15. The method of claim 11, wherein the various predefined categories include a category indicating malicious content present in a given network resource, and wherein the dynamically adjusting a resource-specific time interval is performed wherein:
- in response to a categorization of malicious content in the network resource, the time interval is reduced by a first increment; and
- in response to a categorization of non-malicious content in the network resource, the time interval is increased by a second increment;
- wherein the first increment is larger than the second increment.

16. The method of claim 11, wherein the various predefined categories include a category indicating a suitability of content present in a given network resource, and wherein the dynamically adjusting a resource-specific time interval categorization interval adjustment engine is based on the category indicating the suitability of content.

17. The method of claim 11, wherein the various predefined categories include:
- a first category indicating malicious content present in a given network resource; and
- a second category indicating a suitability of content present in a given network resource;
- wherein dynamically adjusting the resource-specific time interval is based on a combination of the first and the second categories.

18. The method of claim 11, wherein the various predefined categories include:
- a first category indicating malicious content present in a given network resource; and
- a second category indicating a suitability of content present in a given network resource;
- wherein dynamically adjusting the resource-specific time interval is based on the first category but not the second category.

19. A machine-implemented system for categorizing a plurality of network resources, the system comprising:
- means for analyzing collected properties of a network resource to determine applicability of various predefined categories to that network resource and assigning at least one category from among the predefined categories to that network resource according to a determination of applicability of the at least one category to the network resource; and
- means for dynamically adjusting a resource-specific time interval for re-categorizing each one of the network resources based on a plurality of previous categorization results for that network resource, wherein different network resources are associated with correspondingly different re-categorization intervals.

* * * * *